(12) United States Patent
Kirkhope

(10) Patent No.: US 9,593,533 B2
(45) Date of Patent: Mar. 14, 2017

(54) BEARING ASSEMBLY INCLUDING A FOCAL BEARING AND LOAD SHARING THRUST BEARINGS

(71) Applicant: Halliburton Energy Services, Inc., Houston, TX (US)

(72) Inventor: Kennedy J. Kirkhope, Nisku (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/889,109

(22) PCT Filed: Mar. 21, 2014

(86) PCT No.: PCT/CA2014/000280
§ 371 (c)(1),
(2) Date: Nov. 4, 2015

(87) PCT Pub. No.: WO2015/139107
PCT Pub. Date: Sep. 24, 2015

(65) Prior Publication Data
US 2016/0084003 A1    Mar. 24, 2016

(51) Int. Cl.
*F16C 19/00* (2006.01)
*E21B 4/00* (2006.01)
(Continued)

(52) U.S. Cl.
CPC ............... *E21B 4/003* (2013.01); *E21B 7/06* (2013.01); *E21B 17/10* (2013.01); *E21B 33/10* (2013.01); *F16C 19/30* (2013.01); *F16C 19/545* (2013.01); *F16C 23/08* (2013.01); *F16C 25/06* (2013.01); *F16J 15/18* (2013.01); *F16J 15/54* (2013.01); *F16C 23/086* (2013.01)

(58) Field of Classification Search
CPC .................. F16C 19/383; F16C 19/385; F16C 19/545–19/547; F16C 23/08; F16C 23/086; F16C 25/06; F16C 2352/00; E21B 4/003
USPC .......................................... 384/452–455, 619
See application file for complete search history.

(56) References Cited

U.S. PATENT DOCUMENTS 2,374,820 A * 5/1945 Kaye ....................... F16C 19/30
                                                          384/619
3,712,693 A * 1/1973 Root ....................... F16C 19/30
                                                          384/619
(Continued)

FOREIGN PATENT DOCUMENTS

CA          2779159          8/2011
GB          2459573          7/2010
(Continued)

*Primary Examiner* — James Pilkington
(74) *Attorney, Agent, or Firm* — Terrence N. Kuharchuk; Parlee McLaws LLP; Clive D. Menezes

(57) ABSTRACT

An apparatus including a housing, a shaft rotatably extending through the housing, and a bearing assembly for supporting the shaft within the housing, wherein the bearing assembly includes a focal bearing assembly for accommodating tilting of the shaft within the housing and a thrust bearing assembly for transferring thrust loads between the housing and the shaft, and wherein the thrust bearing assembly includes at least two thrust bearings arranged in a load sharing configuration and complementary oblique thrust surfaces for transferring thrust loads through the thrust bearings.

25 Claims, 5 Drawing Sheets

(51) Int. Cl.
*E21B 33/10* (2006.01)
*E21B 7/06* (2006.01)
*E21B 17/10* (2006.01)
*F16J 15/18* (2006.01)
*F16J 15/54* (2006.01)
*F16C 19/30* (2006.01)
*F16C 19/54* (2006.01)
*F16C 23/08* (2006.01)
*F16C 25/06* (2006.01)

(56) References Cited

U.S. PATENT DOCUMENTS

| | | | | |
|---|---|---|---|---|
| 4,501,454 A | * | 2/1985 | Dennis | E21B 4/003 384/619 |
| 4,513,869 A | * | 4/1985 | Goudy | B66C 23/84 212/175 |
| 4,657,090 A | | 4/1987 | Geczy | |
| 4,732,491 A | | 3/1988 | Geczy | |
| 6,170,991 B1 | * | 1/2001 | Manne | F16C 19/545 384/455 |
| 6,244,361 B1 | | 6/2001 | Comeau et al. | |
| 6,769,499 B2 | * | 8/2004 | Cargill | E21B 7/067 175/325.5 |
| 7,104,698 B1 | | 9/2006 | Van Drentham-Susman | |
| 7,278,211 B2 | | 10/2007 | Roggeband | |
| 7,708,468 B2 | * | 5/2010 | Dambaugh | F16C 19/30 384/619 |
| 2009/0272581 A1 | | 11/2009 | Beylotte et al. | |
| 2015/0030453 A1 | * | 1/2015 | Zang | F16C 23/08 416/174 |

FOREIGN PATENT DOCUMENTS

| | | | |
|---|---|---|---|
| GB | 2468433 | | 12/2010 |
| WO | WO 2013/126002 | * | 8/2013 |

\* cited by examiner

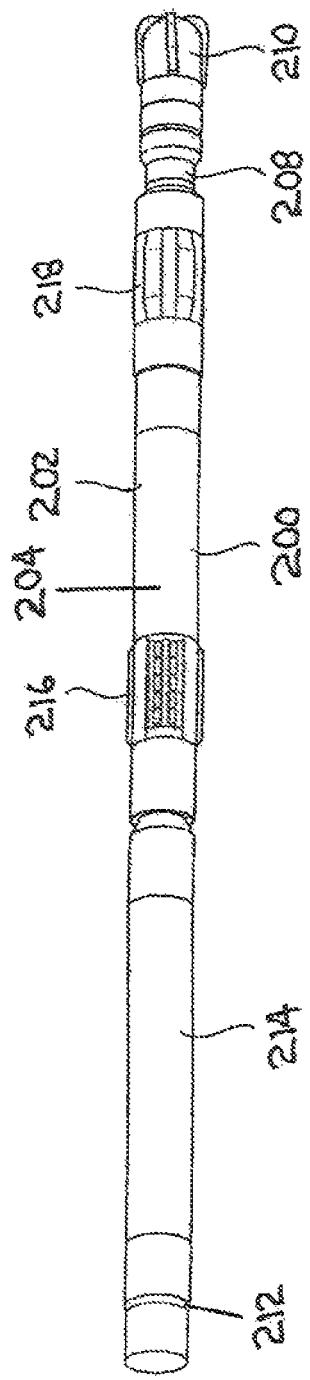
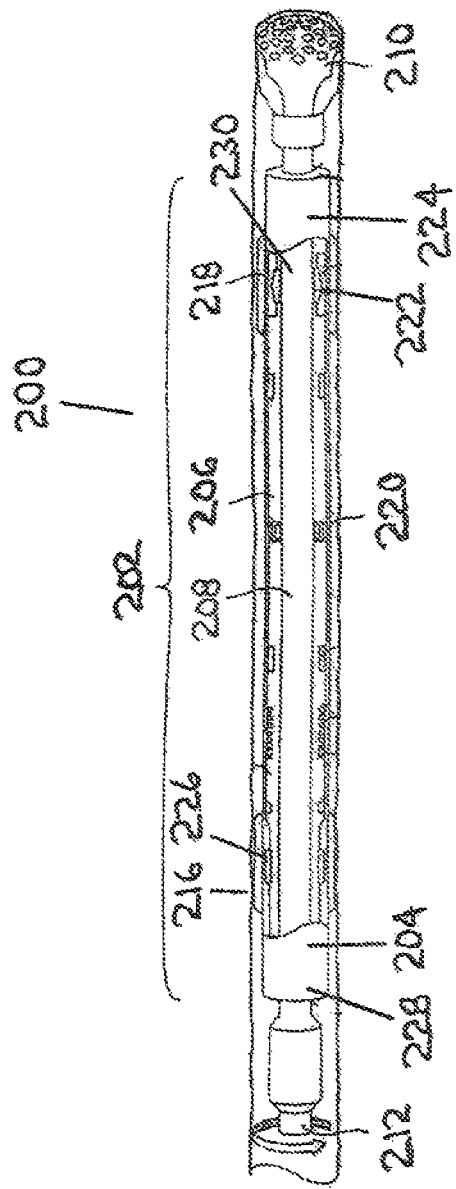
FIG. 5
FIG. 6

BEARING ASSEMBLY INCLUDING A FOCAL BEARING AND LOAD SHARING THRUST BEARINGS

TECHNICAL FIELD

A bearing assembly including a focal bearing assembly and a plurality of thrust bearings.

BRIEF SUMMARY OF THE INVENTION

The present disclosure is directed at a bearing assembly comprising a focal bearing assembly and a thrust bearing assembly, wherein the thrust bearing assembly comprises at least two thrust bearings arranged in a load sharing configuration, and wherein the thrust bearing assembly comprises complementary oblique thrust surfaces for transferring thrust loads through the thrust bearings.

The present disclosure is also directed at an apparatus which comprises a housing, a shaft rotatably extending through the housing, and a bearing assembly, wherein the bearing assembly is comprised of a focal bearing assembly and a thrust bearing assembly, wherein the thrust bearing assembly comprises at least two thrust bearings arranged in a load sharing configuration, and wherein the thrust bearing assembly comprises complementary oblique thrust surfaces for transferring thrust loads through the thrust bearings.

In some embodiments, the apparatus may be configured to be contained within a borehole. In such embodiments, the apparatus may be configured to be lowered within a borehole in any suitable manner including, as non-limiting examples, connected with a pipe string, with a coiled tubing string, with a wireline, or with a slickline. In some embodiments, the apparatus may be an apparatus for use in drilling a borehole. In some embodiments, the apparatus may be a drilling motor. In some embodiments, the apparatus may be a rotary steerable drilling apparatus. In some particular embodiments, the apparatus may be a "point-the-bit" type of rotary steerable drilling apparatus.

BACKGROUND OF THE INVENTION

An apparatus comprising a shaft rotatably extending through a housing may include one or more bearing assemblies. The bearing assemblies may support the shaft within the housing and/or transfer forces between the housing and the shaft.

In some such apparatus, the shaft may be capable of an amount of radial deflection within the housing and/or an amount of tilting within the housing. Tilting of the shaft within the housing may be accompanied by a bending and/or an articulation of the shaft within the housing. Tilting of the shaft within the housing may be caused intentionally for the functioning of the apparatus, and/or may be the result of forces acting on the shaft during use of the apparatus.

BRIEF DESCRIPTION OF DRAWINGS

Embodiments of the invention will now be described with reference to the accompanying drawings, in which:

FIG. 5 is a pictorial view of an exemplary rotary steerable drilling apparatus which may incorporate features of the exemplary embodiments depicted in FIGS. 1-4, shown connected with a drill string.

FIG. 6 is a schematic longitudinal section assembly view of the exemplary rotary steerable drilling apparatus depicted in FIG. 5, shown disconnected from the drill string.

DETAILED DESCRIPTION

Figure 1:
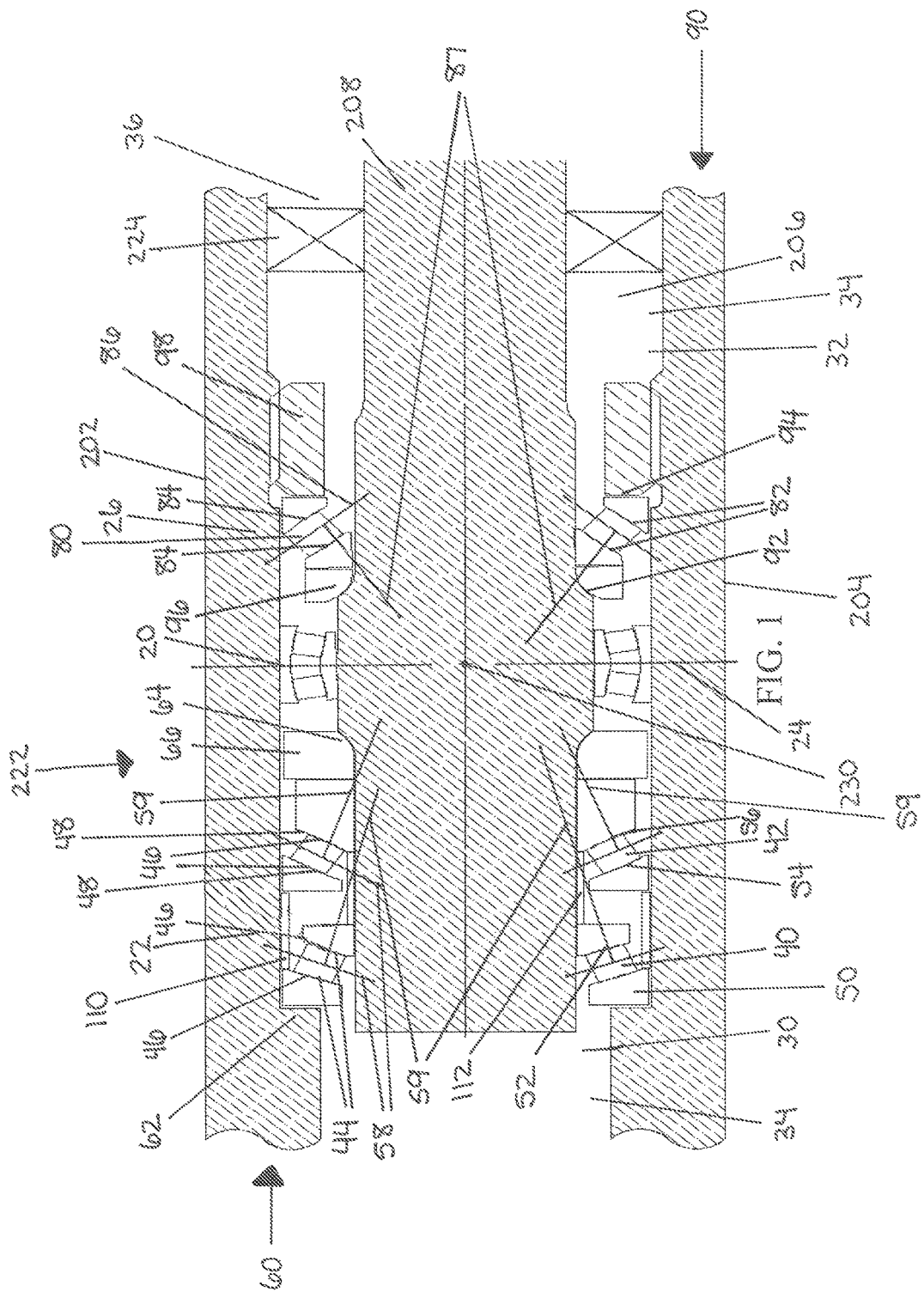
FIG. 1 is a partial longitudinal section assembly schematic view of a first exemplary embodiment of an apparatus.

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

In the description which follows, the relative positions of components of the apparatus may be described with reference to the housing. More particularly, in the description which follows, the relative positions of components of the apparatus may be described "axially" with reference to the housing. As used herein, "axially located along the housing" means an axial position relative to and/or along the longitudinal axis of the housing.

In some embodiments, the shaft may be capable of an amount of radial deflection within the housing and an amount of tilting within the housing about a tilting focal point.

As used herein, "tilting focal point" means a center of longitudinal rotation or longitudinal pivoting (i.e., "tilting") of the shaft about an axis which is perpendicular to a longitudinal axis of the shaft and/or a longitudinal axis of the housing. Tilting of the shaft within the housing may be caused in any manner including, as non-limiting examples, by radial deflection of a portion of the shaft within the housing at a location which is spaced from the tilting focal point and/or by the application of a bending moment or torque to the shaft. Tilting of the shaft within the housing may result in a misalignment of all or a portion of the shaft within the housing.

The tilting focal point is axially located along the housing at an axial focal point position.

The housing may be comprised of any structure which is capable of accommodating a shaft which is rotatable relative to the housing. In some embodiments, the housing may be comprised of a single piece or component. In some embodiments, the housing may be comprised of a plurality of pieces and/or components which may be connected together in any suitable manner.

The housing may define a housing bore so that the shaft rotatably extends through the housing bore in order to extend through the housing. In some embodiments, the housing bore may extend longitudinally through the housing along an axis which is substantially parallel to the longitudinal axis of the housing. In such embodiments, the apparatus may be configured so that the shaft is capable of an amount of tilting within the housing bore about the tilting focal point. In some such embodiments, the apparatus may also be configured so that the shaft is capable of an amount of radial deflection within the housing bore, in order to cause the tilting of the shaft within the housing and/or as a consequence of the tilting of the shaft within the housing.

In some embodiments, the apparatus may be configured so that the shaft extends fully through the housing. In some embodiments, the apparatus may be configured so that the shaft extends only partially through the housing.

The shaft may be comprised of any structure which is capable of rotatably extending through the housing. In some embodiments, the shaft may be comprised of a single piece or component. In some embodiments, the shaft may be comprised of a plurality of pieces and/or components which may be connected together in any suitable manner. In some embodiments, the shaft may define a shaft bore. In such embodiments, the shaft bore may extend fully through the shaft or the shaft bore may extend only partially through the shaft.

In some embodiments, the housing may be comprised of an internal side and an external side. In some embodiments, the internal side and the external side of the housing may be separated by a rotary seal assembly. In some embodiments, the internal side of the housing may contain a lubricating fluid including, as a non-limiting example, a lubricating oil. In some embodiments, the external side of the housing may be exposed to the environment in which the apparatus is located including, as a non-limiting example, a wellbore environment.

The focal bearing assembly accommodates the tilting of the shaft within the housing. The focal bearing assembly may be comprised of one bearing or more than one bearing. The one or more bearings may be comprised of any suitable type of bearing or any suitable combination of suitable types of bearings.

In some embodiments, the focal bearing assembly may be comprised of one or more plain bearings as a plain focal bearing assembly. In some embodiments, the focal bearing assembly may be comprised of one or more rolling element bearings as a rolling element focal bearing assembly including, as non-limiting examples, one or more spherical roller bearings as a spherical roller focal bearing assembly, and/or one or more tapered roller bearings as a tapered roller focal bearing assembly.

In some embodiments, the focal bearing assembly may be comprised of a combination of plain bearings and rolling element bearings as a combination focal bearing assembly.

In some embodiments, the focal bearing assembly may be comprised of a double row focal bearing assembly. In some embodiments, the focal bearing assembly may be comprised of a single row focal bearing assembly.

The thrust bearing assembly transfers thrust loads between the housing and the shaft. The thrust bearing assembly is comprised of at least two thrust bearings, but may be comprised of any number of thrust bearings. The thrust bearings may be comprised of any suitable type of bearing or any suitable combination of suitable types of bearings.

In some embodiments, the thrust bearing assembly may be comprised of plain thrust bearings as a plain thrust bearing assembly including, as non-limiting examples, one or more axial plain thrust bearings as an axial plain thrust bearing assembly, and/or one or more oblique plain thrust bearings as an oblique plain thrust bearing assembly. As used herein, an "axial plain thrust bearing" is a plain thrust bearing in which the plain bearing surfaces are generally or substantially perpendicular to the axis of the apparatus, and an "oblique plain thrust bearing" is a plain thrust bearing in which the plain bearing surfaces are angled relative to the axis of the apparatus.

In some embodiments, the thrust bearing assembly may be comprised of rolling element thrust bearings as a rolling element thrust bearing assembly including, as non-limiting examples, one or more axial rolling element thrust bearings as an axial rolling element thrust bearing assembly, or one or more oblique roller thrust bearings as an oblique rolling element thrust bearing assembly. In some embodiments, an axial rolling element thrust bearing assembly may be comprised of cylindrical roller thrust bearings. In some embodiments, an oblique rolling element thrust bearing assembly may be comprised of spherical roller bearings and/or tapered roller bearings. As used herein, an "axial rolling element thrust bearing" is a rolling element thrust bearing in which the bearing surfaces are generally or substantially perpendicular to the axis of the apparatus, and an "oblique rolling element thrust bearing" is a rolling element thrust bearing in which the bearing surfaces are angled relative to the axis of the apparatus.

In some embodiments, the thrust bearing assembly may be comprised of a combination of plain thrust bearings and rolling element thrust bearings as a combination thrust bearing assembly. In some embodiments, the thrust bearing assembly may be fully or partially contained within the housing and/or within the housing bore.

At least two of the thrust bearings in the thrust bearing assembly are arranged in a load sharing configuration. As used herein, a "load sharing configuration" is a configuration in which a thrust load is divided amongst two or more thrust bearings so that each of the load sharing thrust bearings transfers only a portion of the total thrust load. A load sharing configuration facilitates a relatively higher overall thrust bearing capacity of the thrust bearing assembly and/or the use of thrust bearings having a relatively lower individual thrust bearing capacity.

In some embodiments, a load sharing configuration may result in a thrust load being divided into two equal or unequal parallel loads. In some embodiments, a load sharing configuration may result in a thrust load being divided into three or more equal or unequal parallel loads. The thrust bearings may be arranged in a load sharing configuration in any suitable manner. In some embodiments, the thrust bearing assembly may be comprised of one or more load bearing spacers which may be arranged in parallel between thrust bearings.

The thrust bearing assembly is comprised of complementary oblique thrust surfaces for transferring thrust loads through the thrust bearings.

The oblique thrust surfaces are interposed between the housing and the shaft and accommodate the tilting of the shaft within the housing. The oblique thrust surfaces may be interposed between the housing and the shaft in any manner which enables the oblique thrust surfaces to accommodate the tilting of the shaft within the housing.

In some embodiments, the oblique thrust surfaces may be associated with the housing, the shaft and/or the thrust bearings. The oblique thrust surfaces may be associated with the housing, the shaft and/or the thrust bearings in any suitable manner which enables thrust loads to be transferred through the thrust bearings and thus between the housing and the shaft, while accommodating the tilting of the shaft within the housing. In some embodiments, the housing, the shaft, and/or components interposed between the housing and the shaft may provide the oblique thrust surfaces. In some embodiments, components of a thrust bearing may provide the oblique thrust surfaces.

In some embodiments, an oblique thrust surface may be configured to rotate with the housing and a complementary oblique thrust surface may be configured to rotate with the shaft so that there is relative rotation between the complementary oblique thrust surfaces. In some such embodiments, the thrust bearing assembly may comprise an oblique thrust bearing which is interposed between the complementary oblique thrust surfaces. In some particular embodiments, the complementary oblique thrust surfaces may be provided by components of the thrust bearing.

In some embodiments, complementary oblique thrust surfaces may be configured to rotate together with the housing and/or the shaft, so that there is little or no relative rotation between the complementary oblique thrust surfaces. In some such embodiments, the thrust bearing assembly may comprise one or more thrust bearings which are axially spaced along the housing from the complementary thrust surfaces. In some particular embodiments, the one or more thrust bearings may be comprised of at least two axial thrust bearings arranged in a load sharing configuration. In some particular embodiments, the axial thrust bearings may be axially located between pairs of complementary oblique thrust surfaces. In some particular embodiments, the complementary oblique thrust surfaces may be provided by the housing, the shaft and/or by components interposed between the housing and the shaft.

In some embodiments, the oblique thrust surfaces may be arranged to be generally or substantially perpendicular to the tilting focal point. In some such embodiments, the oblique thrust surfaces may be arranged relative to the tilting focal point so that lines perpendicular to the oblique thrust surfaces converge toward the tilting focal point. In some such embodiments, the oblique thrust surfaces may be arranged relative to the tilting focal point so that lines perpendicular to the oblique thrust surfaces intersect the tilting focal point.

In some embodiments, an oblique thrust surface may be generally or substantially straight. In some embodiments, an oblique thrust surface may be curved. In some embodiments, an oblique thrust surface may be curved to generally or substantially conform with a radius extending from the tilting focal point.

In some embodiments, the oblique thrust surfaces may be comprised of a first pair of complementary oblique thrust surfaces and a second pair of complementary oblique thrust surfaces. In some such embodiments, the thrust bearings may be axially located along the housing between the first pair of complementary oblique thrust surfaces and the second pair of complementary oblique thrust surfaces. In some such embodiments, the thrust bearings may be comprised of axial thrust bearings such as axial plain thrust bearings and/or axial rolling element thrust bearings. In some such embodiments, there may be little or no relative rotation between complementary oblique thrust surfaces.

In some embodiments, the oblique thrust surfaces may be comprised of a first pair of complementary oblique thrust surfaces and a second pair of complementary oblique thrust surfaces. In some such embodiments, a first oblique thrust bearing may be interposed between the first pair of complementary oblique thrust surfaces and a second oblique thrust bearing may be interposed between the second pair of complementary oblique thrust surfaces. In some such embodiments, the oblique thrust bearings may be comprised of oblique plain thrust bearings and/or oblique rolling element thrust bearings. In such embodiments, there is relative rotation between complementary oblique thrust surfaces.

A thrust bearing defines a bearing axis, which is perpendicular to the direction in which thrust loads are transferred through the thrust bearing. The bearing axis of an axial thrust bearing may be generally or substantially perpendicular to the axis of the apparatus. The bearing axis of an oblique thrust bearing may be generally or substantially oblique to the axis of the apparatus. In some embodiments, the bearing axis of an oblique thrust bearing may be generally or substantially perpendicular to the tilting focal point.

In some embodiments, an oblique thrust bearing may be arranged relative to the tilting focal point so that a line perpendicular to the bearing axis of the oblique thrust bearing converges toward the tilting focal point. In some embodiments, an oblique thrust bearing may be arranged relative to the tilting focal point so that a line perpendicular to the bearing axis of the oblique thrust bearing intersects the tilting focal point.

In some embodiments, the apparatus may be comprised of the thrust bearing assembly and a second thrust bearing assembly. The second thrust bearing assembly may be comprised of one thrust bearing or more than one thrust bearing. The second thrust bearing assembly may be comprised of any suitable type of thrust bearing or any suitable combination of suitable types of thrust bearings. In some embodiments, the second thrust bearing assembly may be comprised of plain thrust bearings including, as non-limiting examples, one or more axial plain thrust bearings, and/or one or more oblique plain thrust bearings. In some embodiments, the second thrust bearing assembly may be comprised of rolling element thrust bearings including, as non-limiting examples, one or more axial rolling element thrust bearings, or one or more oblique roller thrust bearings. In some embodiments, an axial rolling element thrust bearing suitable for use in the second thrust bearing assembly may be a cylindrical roller thrust bearing. In some embodiments, an oblique rolling element thrust bearing suitable for use in the second thrust bearing assembly may be a spherical roller bearing and/or a tapered roller bearing. In some embodiments, the second thrust bearing assembly may be comprised of a combination of plain bearings, rolling element bearings, axial bearings and/or oblique bearings.

In some embodiments, the thrust bearing assembly may be axially located along the housing on a first side of the axial focal point position. In some embodiments, the thrust bearing assembly may be axially located along the housing on a second side of the axial focal point position.

In some embodiments in which the apparatus comprises the second thrust bearing assembly, the second thrust bearing assembly may be axially located along the housing on a first side of the axial focal point position. In some embodiments in which the apparatus comprises the second thrust bearing assembly, the second thrust bearing assembly may be axially located along the housing on a second side of the axial focal point position.

In some embodiments in which the apparatus comprises the second thrust bearing assembly, the thrust bearing assembly and the second thrust bearing assembly may be located on the same side of the axial focal point position. In some embodiments in which the apparatus comprises the second thrust bearing assembly, the thrust bearing assembly and the second thrust bearing assembly may be located on opposite sides of the axial focal point position.

In some embodiments in which the apparatus comprises the second thrust bearing assembly, the thrust bearing assembly and the second thrust bearing assembly may be located axially along the housing adjacent to each other. In some embodiments in which the apparatus comprises the second thrust bearing assembly, the thrust bearing assembly and the second thrust bearing assembly may be axially separated from each other along the housing.

In some embodiments, the thrust bearing assembly may be on the internal side of the housing. In some embodiments, the thrust bearing assembly may be on the external side of the housing. In some embodiments in which the apparatus comprises the second thrust bearing assembly, the second thrust bearing assembly may be on the internal side of the housing. In some embodiments in which the apparatus comprises the second thrust bearing assembly, the second thrust bearing assembly may be on the external side of the housing.

In some embodiments, the first side of the axial focal point position may be on the internal side of the housing. In some embodiments, the first side of the axial focal point position may be on the external side of the housing. In some embodiments, the second side of the axial focal point position may be on the internal side of the housing. In some embodiments, the second side of the axial focal point position may be on the external side of the housing. In some embodiments, both sides of the axial focal point position may be on the internal side of the housing. In some embodiments, both sides of the axial focal point position may be on the external side of the housing. In some embodiments, one of the first side and the second side of the axial focal point position may be on the internal side of the housing and the other of the first side and the second side of the axial focal point position may be on the external side of the housing.

In some particular embodiments in which the apparatus comprises the second thrust bearing assembly, the thrust bearing assembly may be located on the first side of the axial focal point position and the second thrust bearing assembly may be located on the second side of the axial focal point position. In some such embodiments, the first side of the axial focal point position may be on the internal side of the housing so that the thrust bearing assembly is located on the internal side of the housing. In some such embodiments, the second side of the axial focal point position may be on the external side of the housing so that the second thrust bearing assembly is located on the external side of the housing.

In some embodiments, the thrust bearing assembly may be a bidirectional thrust bearing assembly which is configured to provide a thrust bearing function with respect to axial loads in both a first axial direction and a second axial direction. In some such embodiments, the second thrust bearing assembly may be omitted. In such embodiments, the thrust bearing assembly may be located on the internal side of the housing or on the external side of the housing. In such embodiments, the thrust bearing assembly may be located on the first side of the axial focal point position or the second side of the axial focal point position. In some particular embodiments, the thrust bearing assembly may be located on the first side of the axial focal point position, and the first side of the axial focal point position may be located on the internal side of the housing so that the thrust bearing assembly is located on the internal side of the housing.

In some embodiments in which the apparatus comprises the second thrust bearing assembly, the thrust bearing assembly and/or the second thrust bearing assembly may be bidirectional thrust bearing assemblies which are configured to provide a thrust bearing function with respect to axial loads in both the first axial direction and the second axial direction. In some embodiments in which the apparatus comprises the second thrust bearing assembly, the thrust bearing assembly and/or the second thrust bearing assembly may be unidirectional thrust bearing assemblies which are configured to provide a thrust bearing function with respect to axial loads in only one direction.

In some particular embodiments in which the apparatus comprises the second thrust bearing assembly, the thrust bearing assembly and the second thrust bearing assembly may both be unidirectional thrust bearing assemblies which are configured to provide a thrust bearing function with respect to axial loads in only one direction. In some particular embodiments in which the apparatus comprises the second thrust bearing assembly, the thrust bearing assembly and the second thrust bearing assembly may both be unidirectional thrust bearing assemblies which are configured to provide a thrust bearing function with respect to axial loads in opposite directions.

In some embodiments, the expected magnitude of the thrust load which is to be transferred between the housing and the shaft in the first axial direction may be different from the expected magnitude of the thrust load which is to be transferred between the housing and the shaft in the second axial direction. In some embodiments, the expected magnitude of the thrust load in the second axial direction may be greater than the magnitude of the expected thrust load in the first axial direction. In some embodiments, the expected magnitude of the thrust load in the first axial direction may be greater than the expected magnitude of the thrust load in the second axial direction.

In some embodiments, the load sharing configuration of the thrust bearing assembly may facilitate an increased thrust bearing capacity of the thrust bearing assembly and/or a reduced size of the thrust bearing assembly relative to the second thrust bearing assembly.

As a result, in some embodiments in which the expected magnitude of the thrust load in the first axial direction may be greater than the expected magnitude of the thrust load in the second axial direction, the thrust bearing assembly may be a unidirectional thrust bearing assembly which is configured to provide a thrust bearing function with respect to axial loads in the first axial direction. In some such embodiments, the thrust bearing assembly may be axially located on the first side of the axial focal point position. In some such embodiments, the first side of the axial focal point position may be located on the internal side of the housing so that the thrust bearing assembly is located on the internal side of the housing.

Figure 2:
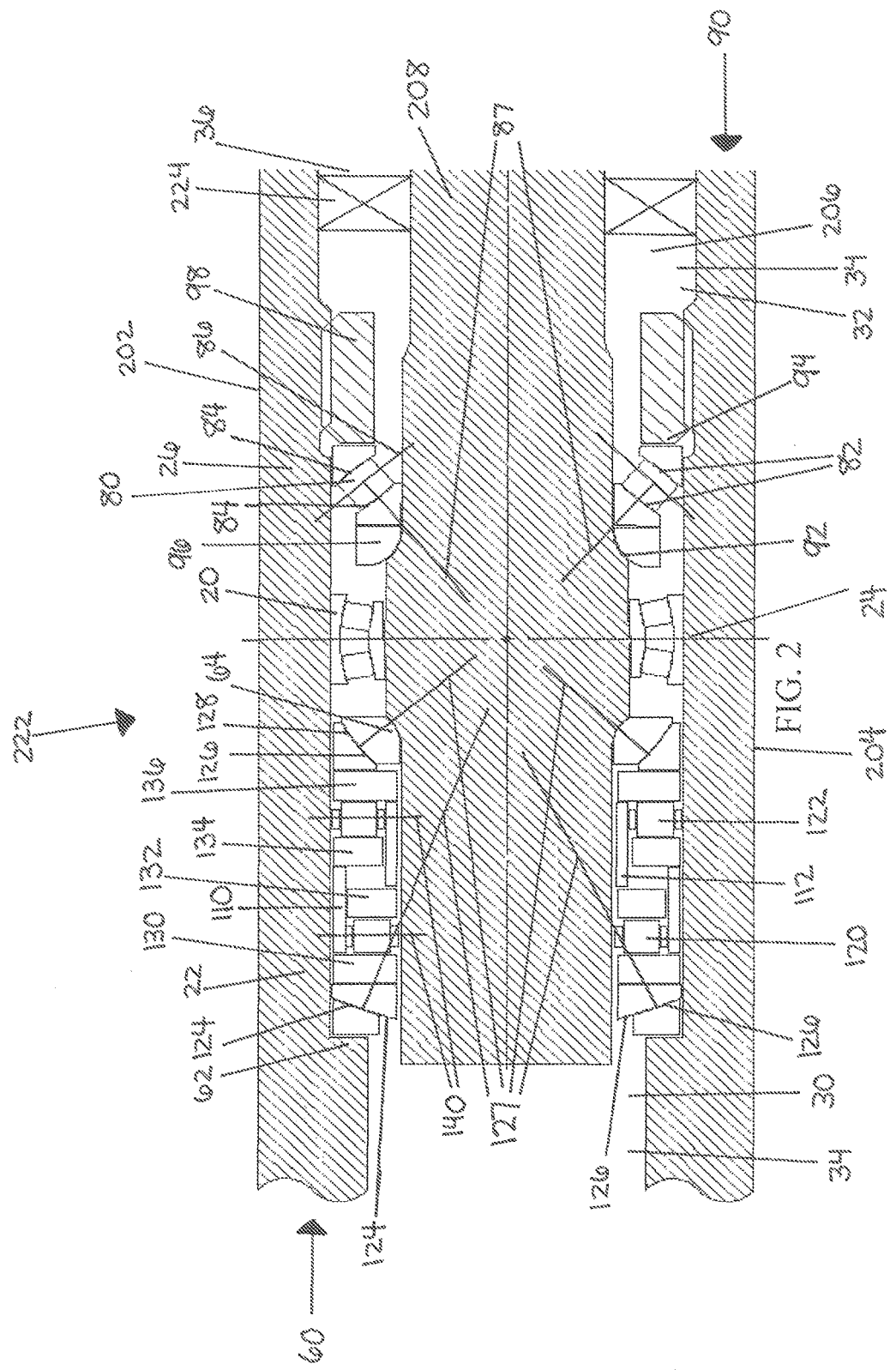
FIG. 2 is a partial longitudinal section assembly schematic view of a second exemplary embodiment of an apparatus.
Figure 3:
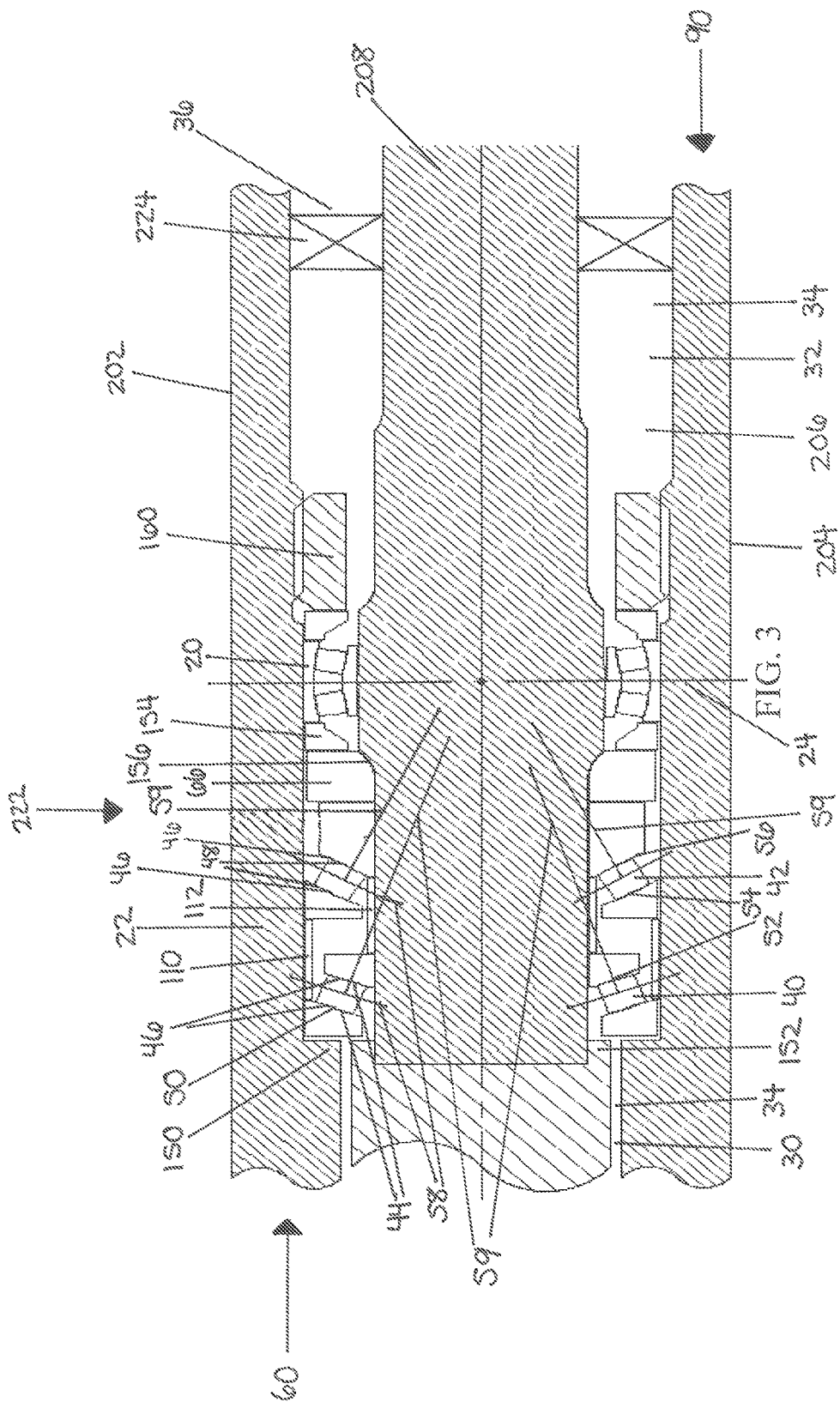
FIG. 3 is a partial longitudinal section assembly schematic view of a third exemplary embodiment of an apparatus.
Figure 4:
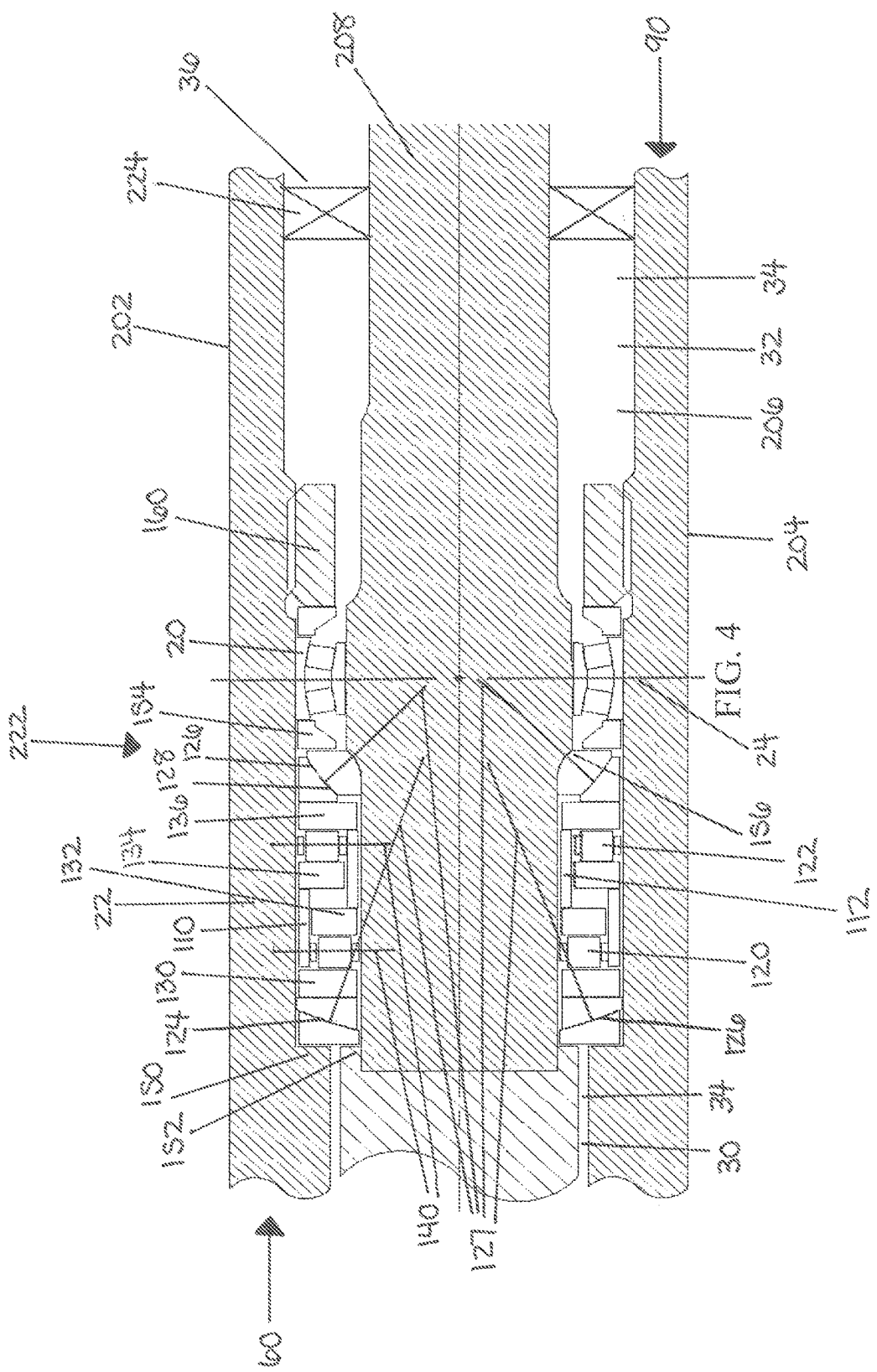
FIG. 4 is a partial longitudinal section assembly schematic view of a fourth exemplary embodiment of an apparatus.

FIGS. 1-4 depict four exemplary embodiments, in which the apparatus may be a rotary steerable drilling apparatus. FIG. 1 is a partial longitudinal section assembly schematic view of a first exemplary embodiment of an apparatus. FIG. 2 is a partial longitudinal section assembly schematic view of a second exemplary embodiment of an apparatus. FIG. 3 is a partial longitudinal section assembly schematic view of a third exemplary embodiment of an apparatus. FIG. 4 is a partial longitudinal section assembly schematic view of a fourth exemplary embodiment of an apparatus.

FIGS. 5-6 depict an exemplary rotary steerable drilling apparatus which may incorporate features of the exemplary embodiments, or features of other embodiments of the apparatus described in this disclosure.

FIGS. 1-6 are exemplary only. The features of the apparatus described in this disclosure may be used in any suitable apparatus and at any suitable location in any suitable apparatus, and the features of the apparatus described in this disclosure may be provided in embodiments other than the exemplary embodiments.

In the description of the exemplary embodiments which follows, features which are identical or equivalent in the four exemplary embodiments will be identified with the same reference numbers.

Referring to FIGS. 5-6, an exemplary point-the-bit rotary steerable drilling apparatus (200) is depicted. As non-limiting examples, the exemplary point-the-bit rotary steerable drilling apparatus (200) may be a rotary steerable drilling apparatus of the type described in U.S. Pat. No. 6,244,361 (Comeau et al) and/or U.S. Pat. No. 6,769,499 (Cargill et al).

The exemplary point-the-bit rotary steerable drilling apparatus (200) includes a housing (202) having an exterior (204) and a housing bore (206). A shaft (208) extends through the housing bore (206). The shaft (208) is rotatable relative to the housing (202).

In the exemplary point-the-bit rotary steerable apparatus (200), a drill bit (210) is connected with a distal end of the shaft (208), and a drill string (212) is connected with a proximal end of the shaft (208). The drill string (212) may include a drill string communication system (214) such as a measurement-while-drilling system.

In the exemplary point-the-bit rotary steerable drilling apparatus (200), an anti-rotation device (216) is connected with or integrated into the housing (202) adjacent to a proximal end of the housing (202), and a near-bit stabilizer (218) is connected with or integrated into the housing (202) adjacent to a distal end of the housing (202).

In the exemplary point-the-bit rotary steerable drilling apparatus (200), a deflection mechanism (220) is contained within the housing (202), which may be actuated to cause radial deflection of a portion of the shaft (208) within the housing bore (206).

In the exemplary point-the-bit rotary steerable drilling apparatus (200), a lower bearing assembly (222), a lower rotary seal assembly (224), an upper bearing assembly (226), and an upper rotary seal assembly (228) are located within the housing bore (206) to support the shaft (208) within the housing (202) and to provide seals between the housing (202) and the shaft (208). The lower bearing assembly (222) is comprised of a focal bearing assembly (20) and a thrust bearing assembly (22).

The deflection mechanism (220) may be comprised of any structure, device or apparatus which is capable of causing the radial deflection of the portion of the shaft (208) within the housing bore (206). The radial deflection of the portion of the shaft (208) may result in bending of the shaft (208) within the housing bore (206). Additionally or alternatively, the radial deflection of the portion of the shaft (208) may result in articulation of the shaft (208) within the housing bore (206), if the shaft (208) is comprised of a joint (not shown) which facilitates such articulation.

In either case, the radial deflection of the portion of the shaft (208) by the deflection mechanism (220) causes tilting of the shaft (208) within the housing bore (206), thereby "pointing" the shaft (208) in a direction which is at an angle relative to the longitudinal axis of the housing (202).

In the exemplary rotary steerable drilling apparatus (200) depicted in FIGS. 3-4, the tilting of the shaft (208) is accommodated by the focal bearing assembly (20). As a result, the radial deflection of the shaft (208) by the deflection mechanism (220) causes the shaft (208) to tilt within the housing bore (206) about a tilting focal point (230), which represents the center of tilting of the shaft (208). In the exemplary embodiments, the tilting focal point (230) is provided by the focal bearing assembly (20).

A first exemplary embodiment is depicted in FIG. 1, for use in the exemplary rotary steerable drilling apparatus (200) of FIGS. 5-6, and is described in the context of FIGS. 5-6 without limiting the potential application and use of the first exemplary embodiment in other apparatus and/or in other configurations.

Referring to FIG. 1, the first exemplary embodiment may be incorporated within the rotary steerable drilling apparatus (200) of FIGS. 5-6, which comprises the housing (202), the shaft (208) rotatably extending through the housing bore (206), and the lower bearing assembly (222) comprising the focal bearing assembly (20) and the thrust bearing assembly (22).

In the first exemplary embodiment, the shaft (208) is capable of an amount of radial deflection within the housing bore (206) and an amount of tilting within the housing bore (206) about the tilting focal point (230).

Referring to FIG. 1, in the first exemplary embodiment, the apparatus comprises the housing (202), the shaft (208), the focal bearing assembly (20), the thrust bearing assembly (22) and a second thrust bearing assembly (26).

The focal bearing assembly (20) provides the tilting focal point (230), which is axially located along the housing (202) at an axial focal point position (24). The axial focal point position (24) has a first side (30) and a second side (32).

In the first exemplary embodiment, the lower rotary seal assembly (224) is axially located along the housing (202) on the second side (32) of the axial focal point position (24). The lower rotary seal assembly (224) is depicted only schematically in FIG. 1, but is configured to accommodate the tilting of the shaft (208) within the housing bore (206).

The lower rotary seal assembly (224) separates the housing (202) into an internal side (34) of the housing (202) and an external side (36) of the housing (202). The internal side (34) of the housing (202) extends between the lower rotary seal assembly (224) and the upper rotary seal assembly (228). In the exemplary embodiment of the rotary steerable drilling apparatus (200), a lubricating fluid such as a lubricating oil (not shown) is contained within the internal side (34) of the housing (202).

In the first exemplary embodiment, the focal bearing assembly (20) is axially located along the housing (202) at the axial focal point position (24) and on the internal side (34) of the housing (202). In other embodiments, the focal bearing assembly (20) may be axially spaced from the axial focal point position (24). In the first exemplary embodiment, the thrust bearing assembly (22) is axially located along the housing (202) on the first side (30) of the axial focal point position (30) and on the internal side (34) of the housing (202). In the first exemplary embodiment, the second thrust bearing assembly (26) is axially located along the housing (202) on the second side (32) of the axial focal point position (30) and on the internal side of the housing (202).

In the first exemplary embodiment, the focal bearing assembly (20) is a double row rolling element focal bearing assembly comprising two rows of spherical roller focal bearings.

In the first exemplary embodiment, the thrust bearing assembly (22) is comprised of a first oblique thrust bearing (40), a second oblique thrust bearing (42), a first pair (44) of complementary oblique thrust surfaces (46), and a second pair (48) of complementary oblique thrust surfaces (46).

In the first exemplary embodiment, the first pair (44) of complementary oblique thrust surfaces (46) is comprised of a proximal oblique surface (50) and a distal oblique surface (52). The proximal oblique surface (50) is configured to rotate with the housing (202) and the distal oblique surface (52) is configured to rotate relative to the proximal oblique surface (50).

In the first exemplary embodiment, the second pair (48) of complementary oblique thrust surfaces (46) is comprised of a proximal oblique surface (54) and a distal oblique surface (56). The distal oblique surface (56) is configured to rotate with the shaft (208) and the proximal oblique surface (54) is configured to rotate relative to the distal oblique surface (56).

In the first exemplary embodiment, the first oblique thrust bearing (40) and the second oblique thrust bearing (42) are both oblique rolling element thrust bearings such as spherical roller thrust bearings or tapered roller thrust bearings so that the thrust bearing assembly (22) is comprised of a rolling element thrust bearing assembly.

In the first exemplary embodiment, the first oblique thrust bearing (40) is interposed between the first pair (44) of oblique thrust surfaces (46), and the second oblique thrust bearing (42) is interposed between the second pair (48) of oblique thrust surfaces (46). In the first exemplary embodiment, the oblique thrust surfaces (46) may be provided by the races or by other components of the oblique thrust bearings (40, 42) or may be separate from the oblique thrust bearings (40, 42).

Referring to FIG. 1, in the first exemplary embodiment, the oblique thrust surfaces (46) are generally or substantially perpendicular to the tilting focal point (230). More particularly, in the first exemplary embodiment, the oblique thrust surfaces (46) are arranged relative to the tilting focal point (230) so that lines perpendicular to the oblique thrust surfaces (46) converge toward the tilting focal point (230) and/or intersect the tilting focal point (230).

Referring to FIG. 1, in the first exemplary embodiment, the first oblique thrust bearing (40) and the second oblique thrust bearing (42) each define an oblique bearing axis (58). In the first exemplary embodiment, the oblique bearing axes (58) of the oblique thrust bearings (40, 42) are generally or substantially perpendicular to the tilting focal point (230). More particularly, in the first exemplary embodiment, the oblique thrust bearings (40, 42) are arranged relative to the tilting focal point (230) so that lines (59) perpendicular to the oblique bearing axes (58) converge toward the tilting focal point (230) and/or intersect the tilting focal point (230).

In the first exemplary embodiment, the thrust bearing assembly (22) is a unidirectional thrust bearing assembly for transferring thrust loads between the housing (202) and the shaft (208) in a first axial direction (60) relative to the apparatus (200). As a result, in the first exemplary embodiment, the thrust bearing assembly (22) is axially located along the housing (202) between a proximal shoulder (62) on the housing (202) and a distal shoulder (64) on the shaft (208). In the first exemplary embodiment, the thrust bearing assembly (22) is further comprised of a bearing spacer collar (66) which surrounds the shaft (208) and is interposed between the second pair (48) of oblique thrust surfaces (46) and the distal shoulder (64).

In the first exemplary embodiment, the second thrust bearing assembly (26) is comprised of a single oblique thrust bearing (80) and a single pair (82) of complementary oblique thrust surfaces (84). One of the oblique thrust surfaces (84) rotates with the housing (202) and the other of the oblique thrust surfaces (84) rotates with the shaft (208).

In the first exemplary embodiment, the single oblique thrust bearing (80) is an oblique rolling element thrust bearing such as a spherical roller thrust bearing or a tapered roller thrust bearing so that the second thrust bearing assembly (26) is comprised of a rolling element thrust bearing assembly. In the first exemplary embodiment, the single oblique thrust bearing (80) is interposed between the single pair (82) of oblique thrust surfaces (84). In the first exemplary embodiment, the oblique thrust surfaces (84) may be provided by the races or by other components of the single oblique thrust bearing (80) or may be separate from the single oblique thrust bearing (80).

Referring to FIG. 1, in the first exemplary embodiment, the oblique thrust surfaces (84) of the second thrust bearing assembly (26) are generally or substantially perpendicular to the tilting focal point (230). More particularly, in the first exemplary embodiment, the oblique thrust surfaces (84) are arranged relative to the tilting focal point (230) so that lines perpendicular to the oblique thrust surfaces (84) converge toward the tilting focal point (230) and/or intersect the tilting focal point (230).

Referring to FIG. 1, in the first exemplary embodiment, the single oblique thrust bearing (80) of the second thrust bearing assembly (26) defines an oblique bearing axis (86). In the first exemplary embodiment, the oblique bearing axis (86) of the single oblique thrust bearing (80) is generally or substantially perpendicular to the tilting focal point (230). More particularly, in the first exemplary embodiment, the single oblique thrust bearing (80) is arranged relative to the tilting focal point (230) so that lines (87) perpendicular to the oblique bearing axis (86) converges toward the tilting focal point (230) and/or intersects the tilting focal point (230).

In the first exemplary embodiment, the second thrust bearing assembly (26) is a unidirectional thrust bearing assembly for transferring thrust loads between the housing (202) and the shaft (208) in a second axial direction (90) relative to the apparatus (200). As a result, in the first exemplary embodiment, the second thrust bearing assembly (26) is axially located along the housing (202) between a proximal shoulder (92) on the shaft (208) and a distal shoulder (94) on the housing (202). In the first exemplary embodiment, the second thrust bearing assembly (26) is further comprised of a bearing spacer collar (96) which surrounds the shaft (208) and is interposed between the pair (82) of oblique thrust surfaces (84) and the proximal shoulder (92). In the first exemplary embodiment, the distal shoulder (94) is provided by a bearing collar (98) which is threadably connected with the housing (202).

In the first exemplary embodiment, the expected magnitude of the thrust load in the first axial direction (60) is greater than the expected magnitude of the thrust load in the second axial direction (90). As a result, in the first exemplary embodiment, the thrust bearing assembly (22) is capable of providing a higher thrust bearing capacity than the second thrust bearing assembly (26). In the first exemplary embodiment, this higher thrust bearing capacity results in part from arranging the first oblique thrust bearing (40) and the second oblique thrust bearing (42) in a load sharing configuration.

More particularly, in the first exemplary embodiment, the oblique thrust bearings (40, 42) in the thrust bearing assembly (22) are configured to divide thrust loads exerted on the thrust bearing assembly (22) in the first axial direction (60) into two parallel loads, so that each of the oblique thrust bearings (40, 42) is required to transfer only a portion of the total thrust load.

In the first exemplary embodiment, the load sharing configuration is achieved by providing a first spacer (110) between the oblique thrust surfaces (46) in the pairs (44, 48) of oblique thrust surfaces (46) which are configured to rotate with the housing (202), and by providing a second spacer (112) between the oblique thrust surfaces (46) in the pairs (44, 48) of oblique thrust surfaces (46) which are configured to rotate with the shaft (208), which results in two parallel "paths" for thrust loads through the thrust bearing assembly (22). In variations of the first exemplary embodiment, the load sharing configuration may be achieved in some other manner, and/or may involve load sharing amongst more than two oblique thrust bearings.

A second exemplary embodiment is depicted in FIG. 2, for use in the exemplary rotary steerable drilling apparatus (200) of FIGS. 5-6, and is described in the context of FIGS. 5-6 without limiting the potential application and use of the second exemplary embodiment in other apparatus and/or in other configurations.

Referring to FIG. 2, the second exemplary embodiment may be incorporated within the rotary steerable drilling apparatus (200) of FIGS. 5-6, which comprises the housing (202), the shaft (208) rotatably extending through the housing bore (206), and the lower bearing assembly (222) comprising the focal bearing assembly (20) and the thrust bearing assembly (22).

The second exemplary embodiment is similar to the first exemplary embodiment, although the oblique thrust bearings (40, 42) in the first exemplary embodiment are substituted with axial thrust bearings in the second exemplary embodiment. As a result, the description of the second exemplary embodiment which follows is limited to the differences between the second exemplary embodiment and the first exemplary embodiment.

In the second exemplary embodiment, the thrust bearing assembly (22) is a unidirectional thrust bearing assembly (22) which is comprised of a first axial thrust bearing (120), a second axial thrust bearing (122), a first pair (124) of complementary oblique thrust surfaces (126), and a second pair (128) of complementary oblique thrust surfaces (126). Both of the oblique thrust surfaces (126) in the first pair (124) are configured to rotate with the housing (202) and both of the oblique thrust surfaces (126) in the second pair (128) are configured to rotate with the shaft (208). As a result, there is little or no relative rotation between the oblique thrust surfaces (126) in each pair (124, 128) of oblique thrust surfaces (126).

In the second exemplary embodiment, the first axial thrust bearing (120) and the second axial thrust bearing (122) are both axial rolling element thrust bearings such as cylindrical roller thrust bearings so that the thrust bearing assembly (22) is comprised of a rolling element thrust bearing assembly.

In the second exemplary embodiment, the first axial thrust bearing (120) and the second axial thrust bearing (122) are both axially located along the housing (202) between the first pair (124) of complementary oblique thrust surfaces (126) and the second pair (128) of complementary oblique thrust surfaces (126).

In the second exemplary embodiment, the first axial thrust bearing (120) is comprised of a proximal race (130) and a distal race (132). The proximal race (130) is configured to rotate with the first pair (124) of oblique thrust surfaces (126) and the distal race (132) is configured to rotate relative to the proximal race (130).

In the second exemplary embodiment, the second axial thrust bearing (122) is comprised of a proximal race (134) and a distal race (136). The distal race (136) is configured to rotate with the second pair (128) of oblique thrust surfaces (126) and the proximal race (134) is configured to rotate relative to the distal race (136).

Referring to FIG. 2, in the second exemplary embodiment, the oblique thrust surfaces (126) are generally or substantially perpendicular to the tilting focal point (230). More particularly, in the second exemplary embodiment, the oblique thrust surfaces (126) are arranged relative to the tilting focal point (230) so that lines (127) perpendicular to the oblique thrust surfaces (126) converge toward the tilting focal point (230) and/or intersect the tilting focal point (230).

Referring to FIG. 2, in the second exemplary embodiment, the first axial thrust bearing (120) and the second axial thrust bearing (122) each define an axial bearing axis (140). In the second exemplary embodiment, the axial bearing axes (140) of the axial thrust bearings (120, 122) are generally or substantially perpendicular to the axis of the apparatus (200).

In the second exemplary embodiment, the unidirectional thrust bearing assembly (22) transfers thrust loads between the housing (202) and the shaft (208) in the first axial direction (60) relative to the apparatus (200). As a result, in the second exemplary embodiment, the thrust bearing assembly (22) is axially located along the housing (202) between the proximal shoulder (62) on the housing (202) and the distal shoulder (64) on the shaft (208). In the second exemplary embodiment, the bearing spacer collar (66) which is included in the first exemplary embodiment is omitted and is substituted with the second pair (128) of oblique thrust surfaces (126).

In the second exemplary embodiment, the second thrust bearing assembly (26) is a unidirectional thrust bearing assembly for transferring thrust loads between the housing (202) and the shaft (208) in the second axial direction (90) relative to the apparatus (200), and is configured in the same manner as the second thrust bearing assembly (26) in the first exemplary embodiment.

In the second exemplary embodiment, the first axial thrust bearing (120) and the second axial thrust bearing (122) are arranged in a load sharing configuration. In the second exemplary embodiment, the load sharing configuration is achieved by providing the first spacer (110) and the second spacer (112), which result in two parallel "paths" for thrust loads through the thrust bearing assembly (22). In variations of the second exemplary embodiment, the load sharing configuration may be achieved in some other manner, and may involve load sharing amongst more than two axial thrust bearings.

A third exemplary embodiment is depicted in FIG. 3, for use in the exemplary rotary steerable drilling apparatus (200) of FIGS. 5-6, and is described in the context of FIGS. 5-6 without limiting the potential application and use of the third exemplary embodiment in other apparatus and/or in other configurations.

Referring to FIG. 3, the third exemplary embodiment may be incorporated within the rotary steerable drilling apparatus (200) of FIGS. 5-6, which comprises the housing (202), the shaft (208) rotatably extending through the housing bore (206), and the lower bearing assembly (222) comprising the focal bearing assembly (20) and the thrust bearing assembly (22).

The third exemplary embodiment is similar to the first exemplary embodiment, although the unidirectional thrust bearing assembly (22) in the first exemplary embodiment has been substituted with a bidirectional thrust bearing assembly (22) in the third exemplary embodiment, and the second thrust bearing assembly (26) is omitted in the third exemplary embodiment. As a result, the description of the third exemplary embodiment which follows is limited to the differences between the third exemplary embodiment and the first exemplary embodiment.

In the third exemplary embodiment, the bidirectional thrust bearing assembly (22) transfers thrust loads between the housing (202) and the shaft (208) in both the first axial direction (60) and the second axial direction (90) relative to the apparatus (200). As previously indicated, the second thrust bearing assembly (26) is omitted in the third exemplary embodiment.

In the third exemplary embodiment, the thrust bearing assembly (22) is axially located along the housing (202) between a proximal shoulder (150) on the housing (202), a proximal shoulder (152) on the shaft (208), a distal shoulder (154) on the housing (202), and a distal shoulder (156) on the shaft (208). In the third exemplary embodiment, the distal shoulder (154) on the housing (202) is provided by a bearing collar assembly (160) which is threadably connected with the housing (202) and which extends through the focal bearing (20).

In the third exemplary embodiment, the proximal oblique thrust surface (50) in the first pair (44) of oblique thrust surfaces (46) is configured to rotate with the housing (202) when transferring thrust loads in the first axial direction (60), and is configured to rotate with the shaft (208) when transferring thrust loads in the second axial direction (90).

In the third exemplary embodiment, the distal oblique thrust surface (56) in the second pair (48) of oblique thrust surfaces (46) is configured to rotate with the shaft (208) when transferring thrust loads in the first axial direction (60), and is configured to rotate with the housing (202) when transferring thrust loads in the second axial direction (90).

In the third exemplary embodiment, a load sharing configuration of the first oblique thrust bearing (40) and the second oblique thrust bearing (42) is achieved by providing the first spacer (110) and the second spacer (112), which result in two parallel "paths" for thrust loads through the thrust bearing assembly (22). In variations of the second exemplary embodiment, the load sharing configuration may be achieved in some other manner, and may involve load sharing amongst more than two axial thrust bearings.

A fourth exemplary embodiment is depicted in FIG. 4, for use in the exemplary rotary steerable drilling apparatus (200) of FIGS. 5-6, and is described in the context of FIGS. 5-6 without limiting the potential application and use of the fourth exemplary embodiment in other apparatus and/or in other configurations.

Referring to FIG. 4, the fourth exemplary embodiment may be incorporated within the rotary steerable drilling apparatus (200) of FIGS. 5-6, which comprises the housing (202), the shaft (208) rotatably extending through the housing bore (206), and the lower bearing assembly (222) comprising the focal bearing assembly (20) and the thrust bearing assembly (22).

The fourth exemplary embodiment is similar to the second exemplary embodiment, although the unidirectional thrust bearing assembly (22) in the second exemplary embodiment has been substituted with a bidirectional thrust bearing assembly (22) in the fourth exemplary embodiment, and the second thrust bearing assembly (26) is omitted in the fourth exemplary embodiment. As a result, the description of the fourth exemplary embodiment which follows is limited to the differences between the fourth exemplary embodiment and the second exemplary embodiment.

In the fourth exemplary embodiment, the bidirectional thrust bearing assembly (22) transfers thrust loads between the housing (202) and the shaft (208) in both the first axial direction (60) and the second axial direction (90) relative to the apparatus (200). As previously indicated, the second thrust bearing assembly (26) is omitted in the fourth exemplary embodiment.

In the fourth exemplary embodiment, the thrust bearing assembly (22) is axially located along the housing (202) between a proximal shoulder (150) on the housing (202), a proximal shoulder (152) on the shaft (208), a distal shoulder (154) on the housing (202), and a distal shoulder (156) on the shaft (208). In the fourth exemplary embodiment, the distal shoulder (154) on the housing (202) is provided by the bearing collar assembly (160) which is threadably connected with the housing (202) and which extends through the focal bearing (20).

In the fourth exemplary embodiment, the first pair (124) of complementary oblique thrust surfaces (126) is configured to rotate with the housing (202) when transferring thrust loads in the first axial direction (60), and is configured to rotate with the shaft (208) when transferring thrust loads in the second axial direction (90).

In the fourth exemplary embodiment, the second pair (128) of complementary oblique thrust surfaces (126) is configured to rotate with the shaft (208) when transferring thrust loads in the first axial direction (60), and is configured to rotate with the housing (202) when transferring thrust loads in the second axial direction (90).

In the fourth exemplary embodiment, a load sharing configuration of the first axial thrust bearing (120) and the second axial thrust bearing (122) is achieved by providing the first spacer (110) and the second spacer (112), which result in two parallel "paths" for thrust loads through the thrust bearing assembly (22). In variations of the second exemplary embodiment, the load sharing configuration may be achieved in some other manner, and may involve load sharing amongst more than two axial thrust bearings.

Bearing assemblies as described herein, including the bearing assemblies (222) of the exemplary embodiments, facilitate a load sharing configuration of thrust bearings which accommodates potential misalignment and/or relative tilting of components of an apparatus between which thrust loads are transferred.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

I claim:

1. An apparatus having an axis, the apparatus comprising:
   (a) a housing defining a housing bore;
   (b) a shaft rotatably extending through the housing bore, wherein the shaft is capable of an amount of radial deflection within the housing bore and an amount of tilting within the housing bore about a tilting focal point, and wherein the tilting focal point is axially located along the housing at an axial focal point position; and
   (c) a bearing assembly for supporting the shaft within the housing bore, wherein the bearing assembly comprises:
      (i) a focal bearing assembly for accommodating the tilting of the shaft within the housing bore; and
      (ii) a thrust bearing assembly for transferring thrust loads between the housing and the shaft, wherein the thrust bearing assembly comprises at least two axial thrust bearings arranged in a load sharing configuration, wherein the axial thrust bearings comprise bearing surfaces, wherein the bearing surfaces of the axial thrust bearings are perpendicular to the axis of the apparatus, wherein the thrust bearing assembly comprises a first pair of complementary oblique thrust surfaces which are angled relative to the axis of the apparatus for transferring thrust loads through the thrust bearings and a second pair of complementary oblique thrust surfaces which are angled relative to the axis of the apparatus for transferring thrust loads through the thrust bearings, wherein the first pair of complementary oblique thrust surfaces rotates together during rotation of the shaft relative to the housing, wherein the second pair of complementary oblique thrust surfaces rotates together during rotation of the shaft relative to the housing, and wherein the axial thrust bearings are axially located along the housing between the first pair of complementary oblique thrust surfaces and the second pair of complementary oblique thrust surfaces.

2. The apparatus as claimed in claim 1 wherein the focal bearing assembly is comprised of a rolling element focal bearing assembly.

3. The apparatus as claimed in claim 2 wherein the rolling element focal bearing assembly is comprised of rolling element bearings selected from the group of rolling element bearings consisting of spherical roller focal bearings, tapered roller focal bearings, and combinations thereof.

4. The apparatus as claimed in claim 1 wherein the thrust bearing assembly is comprised of a rolling element thrust bearing assembly.

5. The apparatus as claimed in claim 1 wherein the axial thrust bearings are cylindrical roller thrust bearings.

6. The apparatus as claimed in claim 1 wherein the thrust bearing assembly is a unidirectional thrust bearing assembly for transferring thrust loads between the housing and the shaft in a first axial direction, further comprising a unidirectional second thrust bearing assembly for transferring thrust loads between the housing and the shaft in a second axial direction.

7. The apparatus as claimed in claim 6 wherein the axial thrust bearings are cylindrical roller thrust bearings.

8. The apparatus as claimed in claim 6 wherein the thrust bearing assembly is axially located along the housing on a first side of the axial focal point position and wherein the second thrust bearing assembly is located axially along the housing on a second side of the axial focal point position.

9. The apparatus as claimed in claim 6 wherein the thrust bearing assembly is located on an internal side of the housing.

10. The apparatus as claimed in claim 6 wherein the first pair of complementary oblique thrust surfaces rotates together with one of the housing and the shaft during rotation of the shaft relative to the housing and wherein the second pair of complementary oblique thrust surfaces rotates together with the other of the housing and the shaft during rotation of the shaft relative to the housing.

11. The apparatus as claimed in claim 6 wherein the load sharing configuration is achieved by providing parallel paths for the thrust loads through the thrust bearing assembly.

12. The apparatus as claimed in claim 11 wherein the thrust bearing assembly comprises a plurality of spacers, wherein each spacer extends between two axial thrust bearings, and wherein the parallel paths are provided by the axial thrust bearings and the spacers.

13. The apparatus as claimed in claim 1 wherein the thrust bearing assembly is a bidirectional thrust bearing assembly.

14. The apparatus as claimed in claim 13 wherein the axial thrust bearings are cylindrical roller thrust bearings.

15. The apparatus as claimed in claim 13 wherein the thrust bearing assembly is located axially along the housing on a first side of the axial focal point position.

16. The apparatus as claimed in claim 13 wherein the thrust bearing assembly is located on an internal side of the housing.

17. The apparatus as claimed in claim 13 wherein the first pair of complementary oblique thrust surfaces rotates together with one of the housing and the shaft during rotation of the shaft relative to the housing and wherein the second pair of complementary oblique thrust surfaces rotates together with the other of the housing and the shaft during rotation of the shaft relative to the housing.

18. The apparatus as claimed in claim 13 wherein the load sharing configuration is achieved by providing parallel paths for the thrust loads through the thrust bearing assembly.

19. The apparatus as claimed in claim 18 wherein the thrust bearing assembly comprises a plurality of spacers, wherein each spacer extends between two axial thrust bearings, and wherein the parallel paths are provided by the axial thrust bearings and the spacers.

20. The apparatus as claimed in claim 1 wherein the oblique thrust surfaces are perpendicular to the tilting focal point.

21. The apparatus as claimed in claim 1 wherein lines perpendicular to the oblique thrust surfaces converge toward the tilting focal point.

22. The apparatus as claimed in claim 1 wherein lines perpendicular to the oblique thrust surfaces intersect the tilting focal point.

23. The apparatus as claimed in claim 1 wherein the first pair of complementary oblique thrust surfaces rotates together with one of the housing and the shaft during rotation of the shaft relative to the housing and wherein the second pair of complementary oblique thrust surfaces rotates together with the other of the housing and the shaft during rotation of the shaft relative to the housing.

24. The apparatus as claimed in claim 1 wherein the load sharing configuration is achieved by providing parallel paths for the thrust loads through the thrust bearing assembly.

25. The apparatus as claimed in claim 24 wherein the thrust bearing assembly comprises a plurality of spacers, wherein each spacer extends between two axial thrust bearings, and wherein the parallel paths are provided by the axial thrust bearings and the spacers.

* * * * *

UNITED STATES PATENT AND TRADEMARK OFFICE
CERTIFICATE OF CORRECTION

PATENT NO. : 9,593,533 B2
APPLICATION NO. : 14/889109
DATED : March 14, 2017
INVENTOR(S) : Kennedy J. Kirkhope It is certified that error appears in the above-identified patent and that said Letters Patent is hereby corrected as shown below:

In the Specification

Column 1, Line 58, immediately preceding the heading "BRIEF DESCRIPTION OF DRAWINGS", insert the heading --BRIEF SUMMARY OF THE INVENTION-- and the subsequent related paragraphs currently found at Column 1, Lines 10 - 41 as follows:
--BRIEF SUMMARY OF THE INVENTION
The present disclosure is directed at a bearing assembly comprising a focal bearing assembly and a thrust bearing assembly, wherein the thrust bearing assembly comprises at least two thrust bearings arranged in a load sharing configuration, and wherein the thrust bearing assembly comprises complementary oblique thrust surfaces for transferring thrust loads through the thrust bearings.
The present disclosure is also directed at an apparatus which comprises a housing, a shaft rotatably extending through the housing, and a bearing assembly, wherein the bearing assembly is comprised of a focal bearing assembly and a thrust bearing assembly, wherein the thrust bearing assembly comprises at least two thrust bearings arranged in a load sharing configuration, and wherein the thrust bearing assembly comprises complementary oblique thrust surfaces for transferring thrust loads through the thrust bearings.
In some embodiments, the apparatus may be configured to be contained within a borehole. In such embodiments, the apparatus may be configured to be lowered within a borehole in any suitable manner including, as non-limiting examples, connected with a pipe string, with a coiled tubing string, with a wireline, or with a slickline. In some embodiments, the apparatus may be an apparatus for use in drilling a borehole. In some embodiments, the apparatus may be a drilling motor. In some embodiments, the apparatus may be a rotary steerable drilling apparatus. In some particular embodiments, the apparatus may be a "point-the-bit" type of rotary steerable drilling apparatus.--

Signed and Sealed this
Second Day of October, 2018

Andrei Iancu
*Director of the United States Patent and Trademark Office*